United States Patent
Van Doren

(10) Patent No.: US 10,290,290 B2
(45) Date of Patent: May 14, 2019

(54) COMPOSITE REED

(71) Applicant: VARLEPIC PARTICIPATIONS, Paris (FR)

(72) Inventor: Bernard Van Doren, Le Lavandou (FR)

(73) Assignee: VARLEPIC PARTICIPATIONS, Paris (FR)

( * ) Notice: Subject to any disclaimer, the term of this patent is extended or adjusted under 35 U.S.C. 154(b) by 69 days.

(21) Appl. No.: 15/511,568

(22) PCT Filed: Sep. 15, 2015

(86) PCT No.: PCT/FR2015/052473
§ 371 (c)(1),
(2) Date: Mar. 15, 2017

(87) PCT Pub. No.: WO2016/042259
PCT Pub. Date: Mar. 24, 2016

(65) Prior Publication Data
US 2017/0263219 A1    Sep. 14, 2017

(30) Foreign Application Priority Data
Sep. 16, 2014    (FR) ..................... 14 58740

(51) Int. Cl.
*G10D 9/02* (2006.01)
*B29C 70/52* (2006.01)
(Continued)

(52) U.S. Cl.
CPC ............. *G10D 9/023* (2013.01); *B29C 70/52* (2013.01); *B29K 2023/08* (2013.01);
(Continued)

(58) Field of Classification Search
CPC ............. B29C 70/52; B29K 2023/14; B29K 2023/08; B29K 2223/06; B29L 2031/758; G10D 9/023
See application file for complete search history.

(56) References Cited

U.S. PATENT DOCUMENTS 4,559,262 A * 12/1985 Cogswell .................. B29B 9/14
156/166
5,542,331 A * 8/1996 Hartmann .............. G10D 9/023
84/383 A
(Continued)

FOREIGN PATENT DOCUMENTS

EP    1787790    † 5/2007
EP    1787790 A1 * 5/2007 ........... B29C 51/082
(Continued)

OTHER PUBLICATIONS

International Search Report, dated Nov. 26, 2015, from corresponding PCT application.

*Primary Examiner* — Kimberly R Lockett
(74) *Attorney, Agent, or Firm* — Young & Thompson

(57) ABSTRACT

Disclosed is a composite reed (55) for a wind instrument and to a method for producing such a reed. The reed has a matrix made of a polymer material and a plurality of reinforcing fibres made of another polymer material, embedded inside the matrix. The other polymer material is a thermoplastic polymer material.

19 Claims, 1 Drawing Sheet

(51) Int. Cl.
  *B29K 23/00*     (2006.01)
  *B29K 105/00*    (2006.01)
  *B29K 223/00*    (2006.01)
  *B29L 31/00*     (2006.01)

(52) U.S. Cl.
  CPC .. *B29K 2023/14* (2013.01); *B29K 2105/0085* (2013.01); *B29K 2223/06* (2013.01); *B29L 2031/758* (2013.01)

(56) References Cited

U.S. PATENT DOCUMENTS

| | | |
|---|---|---|
| 6,087,571 A | 7/2000 | Legere |
| 2009/0301284 A1* | 12/2009 | Legere .................. G10D 9/023 84/383 A |

FOREIGN PATENT DOCUMENTS

| | | | |
|---|---|---|---|
| FR | 2 646 270 A3 | | 10/1990 |
| FR | 2646270 | † | 10/1990 |
| GB | 783766 A | | 9/1957 |
| WO | 2016/042259 | † | 3/2016 |

\* cited by examiner
† cited by third party

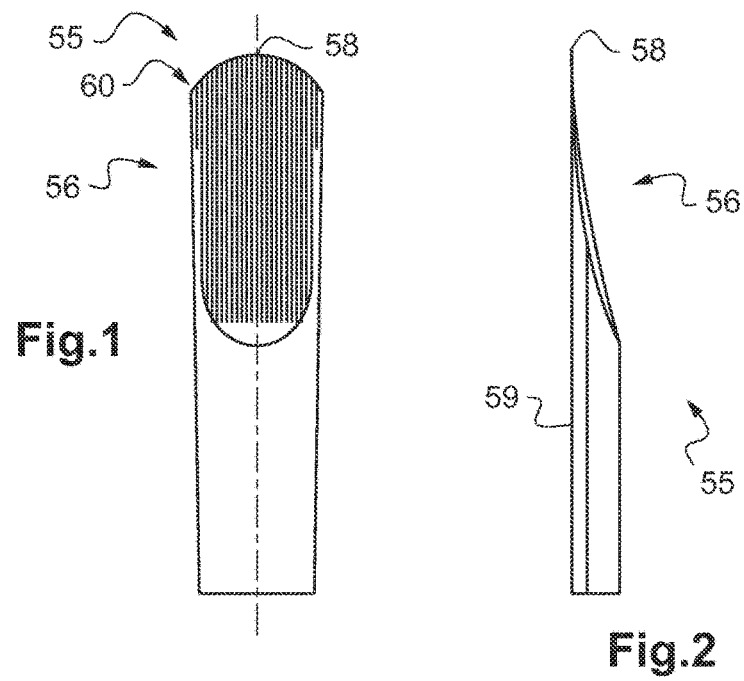
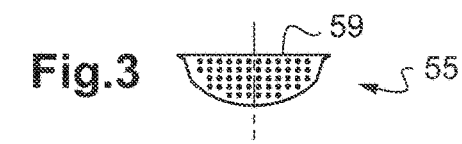
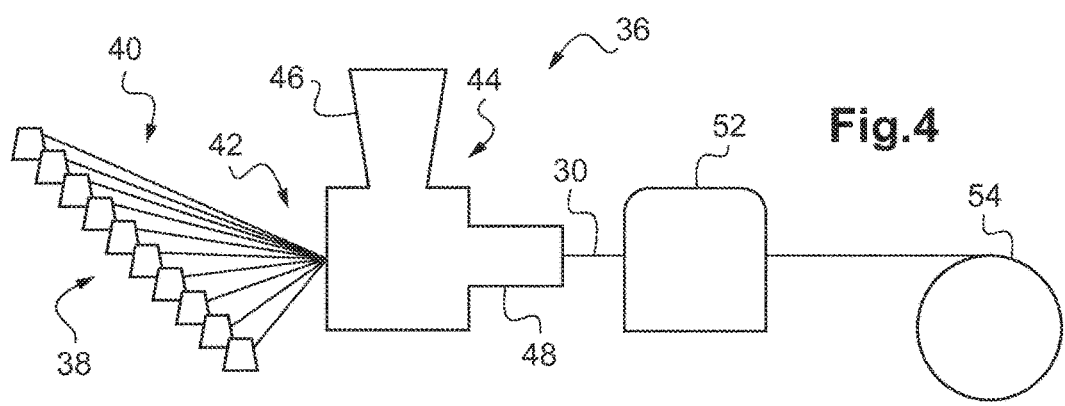
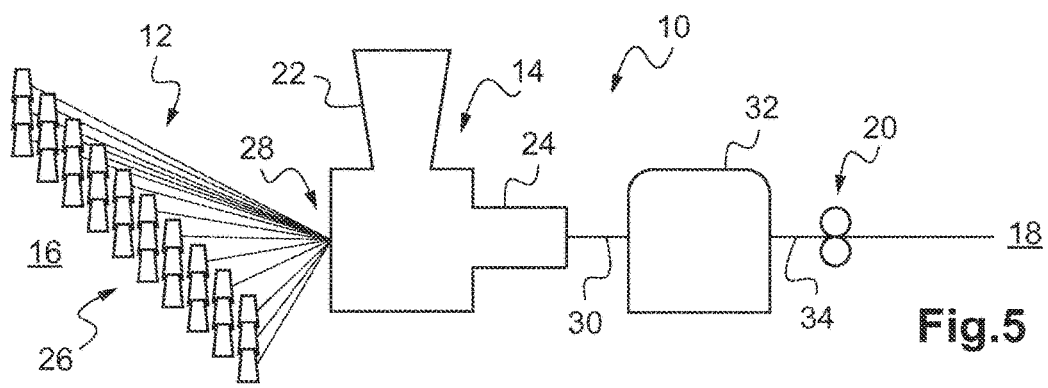

COMPOSITE REED

The present invention relates to a composite reed for a wind instrument.

One field of application envisioned is that of wind instruments in which the reed is vibrated by a column of air produced by the puff of the instrumentalist. Said instruments are for example clarinets or saxophones, for which a single reed is used, or else oboes, bassoons, bombards and other bagpipes, with a double reed.

Conventionally, single reeds are made of a strip of reed, which is machined to obtain a suitable shape and thickness. The reed is held on a mouthpiece of the instrument by means of a generally metal ligature. Thus, reeds are made of a natural material, the mechanical properties of which are neither constant from one reed to the other, nor constant in time. However, the tone of instruments equipped with such reeds depends thereon. Reeds are thus very sensitive to the physicochemical characteristics of the reed, from which the mechanical properties ensue.

Consequently, the idea has been conceived to industrially produce composite reeds which not only reproduce the mechanical characteristics of reeds made of natural material, but which also have properties that are reproducible from one reed to the other.

To do this, short fibers have been inserted into a matrix of a polymer material with the hope of obtaining properties similar to those of reed. However, the mixed material obtained, from these natural fibers and fibers of a synthetic material, is not satisfactory from a tone point of view.

Consequently, the idea has been conceived to produce a totally synthetic reed. Thus, a composite reed which has a matrix made of an epoxy or else phenolic thermosetting polymer and of reinforcing fibers, made of carbon for example, has been produced. Reference may be made to document U.S. Pat. No. 5,542,331, which describes the production of such a composite reed.

While the reeds thus produced have mechanical properties that are relatively reproducible and constant over time, their sound quality is not however equivalent to that which can be obtained with reed.

Thus, a problem which arises and which the present invention aims to solve is that of providing a composite reed of which the mechanical properties are constant, but also which makes it possible to obtain a good tone of the instruments in which it is used.

For this purpose, and according to a first subject, the present invention provides a composite reed for a wind instrument which has a matrix made of a polymer material and a plurality of reinforcing fibers made of another polymer material, embedded inside said matrix; said other polymer material being a thermoplastic polymer material.

Thus, a characteristic of the invention lies in the use of reinforcing fibers made of a thermoplastic polymer, chosen for example from the polyolefin family. In addition, according to one particularly advantageous embodiment of the invention, the fibers of said plurality of fibers are continuous fibers, and they extend along a longitudinal direction inside said matrix. In other words, the reinforcing fibers extend along the longitudinal direction of the reed, and over its entire length. Thus, the reinforcing fibers extend longitudinally inside the matrix and give the reed anisotropic mechanical properties. By virtue of the fibers, the elastic modulus of the reed is greater in the longitudinal direction than that which is measured in the transverse direction.

Furthermore, according to one particularly advantageous characteristic, said polymer material, constituting the matrix, is also a thermoplastic polymer material. It also belongs, for example, to the polyolefin family.

Furthermore, said polymer material of the matrix has a relative density of between 0.80 and 0.92. In that way, a composite reed of which the mechanical properties are very close to those of a strip of natural reed is obtained. In this way, a tone of the instrument equipped with such a reed that is equivalent to that of the same instrument equipped with a reed made of reed is obtained. Furthermore, its mechanical properties are reproducible from one reed to the other.

In addition, the thermosetting polymer materials used according to the prior art to form the matrix have relative densities generally greater than 1, while with thermoplastic polymer materials, and in particular with polyolefins, it is possible to provide materials of which the density is less than 1, and more specifically between 0.80 and 0.92, and for example between 0.80 and 0.90.

The relative density is thus defined as being the ratio of the weight by volume of the material relative to the weight by volume of another body taken as reference, and in the case in point water at 4° C.

It will be observed that the thermoplastic polymer material and more specifically the polyolefins used to form the matrix has/have such a simple density. Indeed, it is always possible to decrease the density of a material by incorporating therein for example air in the form of bubbles or else of hollow beads. However, the mechanical properties are considerably affected by this and the material is no longer suitable for producing reeds.

Preferentially, said other polymer material has a melting point above the melting point of said a polymer material. In this way, and as will be explained hereinafter in greater detail, the reinforcing fibers have a melting point above the polymer material forming the matrix, and consequently, it is easy to embed the fibers inside the matrix without modifying their intrinsic properties. Preferentially, the reinforcing fibers of said plurality of fibers are continuous fibers.

According to another subject, the invention provides a process for producing a composite reed of the type comprising the following steps: a) a polymer material in the molten state and a plurality of fibers made of another polymer material are provided; b) said fibers are embedded inside said polymer material in the molten state; c) curing of said a polymer material in the molten state is brought about so as to trap said fibers; and d) said composite reed is formed in said cured polymer material; said other polymer material is a thermoplastic polymer material. Preferentially, said a polymer material, forming the matrix, is a thermoplastic polymer material.

Thus, a characteristic of the invention lies in the use of fibers made of thermoplastic polymer material for producing a reed.

According to one preferential embodiment, in step b), the fibers of said plurality of fibers are kept substantially parallel to one another for embedding said plurality of fibers inside said polymer material. In this way, a reed having mechanical properties that are reinforced in the direction of the fibers that are parallel relative to the transverse direction is obtained. The characteristics of strips of natural reed for producing reeds are thus obtained.

Furthermore, by virtue of the use of a thermoplastic polymer material, also for the matrix, the production process is made very much easier. This is because the thermoplastic material can easily be brought from an ambient temperature at which it is rigid to a melting point at which it softens. Thus, the thermoplastic material is easily brought to its melting point in order to be able to embed the fibers therein.

Next, the temperature of the thermoplastic material of the matrix is made to decrease so that it returns to its original rigidity, while the fibers are trapped inside. As will be explained in greater detail in the remainder of the description, various processing methods are possible.

Particularly advantageously, said other polymer material of the fibers has a melting point above the melting point of said a polymer material of the matrix. Thus, when the fibers are embedded in the polymer material of the softened matrix, the thermoplastic polymer material of the fibers is in no way affected by the temperature to which the material of the matrix is brought. When the temperature of the latter is decreased, the fibers are trapped inside the matrix without their mechanical properties having been affected.

Other particularities and advantages of the invention will emerge on reading the description provided hereinafter of particular embodiments of the invention, given by way of indication, but which is nonlimiting, with reference to the appended drawings in which:

FIG. 1 is a diagrammatic view from above of a composite reed in accordance with the invention;

FIG. 2 is a diagrammatic view of the section of the composite reed shown in FIG. 1;

FIG. 3 is a diagrammatic rear view of the composite reed shown in FIG. 1;

FIG. 4 is a schematic of an apparatus implementing a process for producing a composite reed according to the invention in accordance with a first embodiment; and FIG. 5 is a schematic of an apparatus implementing a process for producing a composite reed according to the invention in accordance with a second embodiment.

Reference will be made first of all to FIGS. 4 and 5 in order to describe various modes of production of a composite reed in accordance with the invention. In the two embodiments of the process according to the invention, a composite rod, which it will be possible to cut into sections so that it can then be trimmed into strips so as to form a reed, is produced. In addition, in the two embodiments, reinforcing fibers made of a polymer material, combined in various roves or else in strands, are used.

These fibers of polymer material are made of a thermoplastic polymer material, and more specifically of a material belonging to the category of polyolefins, or polyalkenes. They are saturated aliphatic polymers. More specifically, the polymer material used is an olefin copolymer. In the example presented here, the reinforcing fibers are made of polypropylene and their melting point is close to 160° C. Ideally, the polymer has a Poisson coefficient close to 0.5. Furthermore, its glass transition temperature is between −150° C. and 0° C.

It is also envisioned to use polyethylene fibers of which the melting point is also close to 160° C.

In addition, according to the two production modes presented in FIGS. 4 and 5, a thermoplastic polymer material intended to form the matrix is used. According to the example presented herein, the polymer material is a polyolefin of which the melting point is below that of the thermoplastic polymer of the fibers. In the case in point, it is a propylene/ethylene/polypropylene terpolymer. It is chosen, firstly, such that its melting point is below that of the melting point of the fibers, and about 130° C., advantageously 140° C., and secondly such that its density is between 0.80 and 0.92, for example between 0.80 and 0.90. Furthermore, it will be observed that the polymer material of the matrix has a glass transition temperature of between −100° C. and 0° C. and preferably between −60° C. and −10° C.

As will be explained hereinafter, by choosing thermoplastic polymers of the same nature, although their melting points are substantially different, a better adhesion of the fibers and of the matrix is obtained. According to one implementation variant, it is envisioned to use a low-density polyethylene as matrix and reinforcing fibers made of a high-density polyethylene.

It will be added that these olefinic thermoplastic polymers are recognized as being innocuous on contact with food.

Represented in FIG. 5 is an apparatus 10 which makes it possible to directly produce a composite rod, according to a first embodiment. It operates according to the principle of pultrusion, that is to say first bundles of fibers 12 are pulled through a first extruder 14. These fiber bundles can be likened to bundles of filaments that are continuous, substantially parallel and non-twisted. The first bundles of fibers 12 are pulled from a first upstream point 16 to a first downstream point 18 by means of a drive roll 20. The extruder 14 has, schematically, a first hopper 22 loaded with the abovementioned terpolymer intended to form the matrix, and a first extrusion screw 24 intended to soften the polymer and to drive it. The terpolymer is loaded into the first hopper 22 in pulverulent form or else in the form of granules.

At the upstream point 16, the first bundles of fibers 12 are loaded on to a first winder 26 comprising a plurality of first beams each receiving a rove of continuous fibers. The roves of fibers, or bundles of fibers 12, are guided through a first inlet 28 of the extruder 14 and are stretched parallel to one another inside the extruder 14. The roves of fibers extend along a transverse direction and along a vertical direction on several superimposed layers. They thus cross the die of the extrusion screw 24 so as to be embedded with the abovementioned molten terpolymer. Since the melting point of the fibers is above the melting point of the matrix, they are in no way damaged when the molten terpolymer comes into contact with them. In this way they retain their mechanical properties inside the matrix after cooling.

The die has a rectangular cross section between 3.5 and 5.5 mm thick and between 15 mm and 25 mm wide. Thus, a rod 30 formed is pulled out of the extrusion screw 24 and enters a cooling device 32. In this way, a cured rod 34 having a cross section substantially equal to the cross section of the abovementioned die is obtained at the outlet. The fiber roves are then trapped longitudinally and parallel to one another inside the cured rod 34. Furthermore, according to a section, the various fiber roves are evenly spaced out with respect to one another. Advantageously, the percentage of fibers in the rod obtained is between 35 and 50%, for example 45%.

The cured rod 34 is then cut into sections of length close to 90 mm. These sections are then taken up so that they can be machined and converted into reeds. The shape of the reeds obtained after machining the rod sections will be explained in greater detail in the remainder of the description with reference to FIGS. 1 to 3.

An apparatus of strand-to-strand type 36 is represented diagrammatically in FIG. 4 to which reference will now be made. It makes it possible to produce, according to a second embodiment, composite layers which will then be superimposed so as to form rods.

Thus, a second winder 38 makes it possible to store second bundles of roves of fibers 40 of the same type as the bundles of roves of fibers mentioned above. The bundles of roves of fibers 40 are guided toward the inlet 42 of a second extruder 44 equipped with a second hopper 46 and with a second extrusion screw 48. The second hopper 46 is loaded with a terpolymer identical to the abovementioned terpolymer. Thus, the roves of fibers are extruded side by side in the same direction through the second extruder 44, parallel to the second extrusion screw 48. The second extrusion screw 48 then delivers, on to the roves of fibers stretched side by side, the molten terpolymer so as to produce a sheet of bonded fibers 50, between 15 mm and 25 mm wide. The sheet of bonded fibers 50 then passes through a second cooling device 52 so that it can then be wound on to a spool 54.

Next, lengths of sheet of bonded fibers 50 are superimposed and introduced into a calender that is heated, for example to 145° C., so as to form a coherent rod. Indeed, under the effect of the heat and pressure, the sheets of bonded fibers 50 stick to one another so as to form just one continuous matrix inside which are extended superimposed layers of reinforcing fibers. The rod thus obtained, just like the previous one, can then be cut into sections also of length close to 90 mm.

Thus, according to the two processes described above, an anisotropic composite rod is obtained. Indeed, by virtue of the roves of longitudinally extended fibers, the tensile modulus is much greater along the direction of the length of the rod compared with the tensile modulus along the direction of the width. Preferentially, the tensile modulus along the direction of the length of the composite rod is between 5000 and 15 000 MPa, while the tensile modulus along the direction of the width is less than a value of between 5 times less and 15 times less the value of the tensile modulus along the direction of the length.

In addition, although the relative density of the thermoplastic polymer material of the fibers is substantially greater than 0.9, since the weight of terpolymer constituting the matrix is predominant, the overall relative density of the rod remains between 0.80 and 0.92, advantageously between 0.80 and 0.90.

The rod sections obtained by either of the apparatuses described above will then be machined so as to form the reeds. First of all, to produce a reed 55 suitable for clarinets in B flat, and as represented in FIGS. 1 to 3, a preform is produced, of which the thickness is substantially greater than 3.3 mm, the width is substantially greater than 16.4 mm and the length is substantially greater than 69 mm. The reinforcing fibers thus extend parallel to one another along the length of the preform, since in fact the roves of fibers extend in the longitudinal direction of the rod from which the preform is derived. Next, a flat lower face 59, commonly called reed table, is machined, followed by the sides of the reed, and a beveled upper part 56, specifically called reed bevel. To do this, the preform is cut into at mid-height and is gradually thinned up to one free end forming an edge 58 with the flat lower face 59. The edge 58, also called reed end, is machined in a rounded shape 60 so as to obtain a convexity.

It will be observed that the dimensions of the reeds vary according to the type of instrument in which they are installed. Consequently, the machining of the rod sections is not limited to the dimensions indicated above.

Furthermore, since the reinforcing fibers extend parallel to one another along the length of the preform, they thus extend parallel to one another along the length of the reed.

According to a third embodiment that is not represented, the matrix made of thermoplastic material is preformed in the form of a strip and then the reinforcing fibers are combined therewith by calendering, so as to be able to produce composite layers of strip the same as those obtained according to the second embodiment. According to one implementation mode, the calender used is a heating calender; it has a rigid heating roll capable of coming into contact against a roll coated with a deformable surface, for example made of polyurethane. The calendering temperature is for example close to 150° C. Thus, the preformed strip and the bundle of reinforcing fibers converge toward the calender between the two rolls. By virtue of the heating of the calender, the preform strip softens, while the fibers of the fiber roves are compressed and pushed into the strip between the two rolls.

According to another implementation variant, the bundle of fibers is calendered between two preformed strips so as to form the composite strip.

The composite strips are then cut up and superimposed so as to be thermoformed in a thermoforming mold having two opposite imprints. A plurality of strips of a given length are used. Between 20 and 40 composite strips for example are superimposed and introduced into the mold, and then hot-compressed together. In this way, rods similar to those obtained according to the second embodiment, having a thickness of between for example 2.5 and 4.5 mm, are obtained.

The invention claimed is:

1. A composite reed (55) for a wind instrument which has a matrix made of a polymer material and a plurality of reinforcing fibers made of another polymer material, embedded inside said matrix, said other polymer material being a thermoplastic polymer material;
   wherein the reinforcing fibers of said plurality of fibers are continuous fibers, all of said reinforcing fibers being of the same thermoplastic polymer material,
   wherein each of said reinforcing fibers extend in a longitudinal direction of the reed and over an entire length of the reed, inside said matrix, and
   wherein a value of a first tensile modulus of the composite reed along a direction of the length of the composite reed is between 5000 and 15000 MPa, and a value of a second tensile modulus of the composite reed along a direction of the width of the composite reed is between 5 times less and 15 times less than the value the first tensile modulus.

2. The composite reed as claimed in claim 1, wherein said polymer material is a thermoplastic polymer material.

3. The composite reed as claimed in claim 2, wherein said polymer material is a propylene/ethylene/polypropylene terpolymer.

4. The composite reed as claimed in claim 2, wherein said polymer material has a relative density of between 0.80 and 0.92.

5. The composite reed as claimed in claim 1, wherein said other polymer material is polypropylene.

6. The composite reed as claimed in claim 1, wherein said other polymer material has a melting point above the melting point of said polymer material.

7. A process for producing a composite reed of the type comprising the following steps:
   a) a polymer material in the molten state and a plurality of individual reinforcing fibers made of another polymer material are provided, said other polymer material being a thermoplastic polymer material;
   b) said fibers are embedded inside said polymer material in the molten state;
   c) curing of said polymer material in the molten state is brought about so as to trap said fibers to thereby obtain an anisotropic composite rod having a value of a first tensile modulus of the composite reed along a direction of a length of the composite reed is between 5000 and 15000 MPa, and a value of a second tensile modulus of the composite reed along a direction of the width of the composite reed is between 5 times less and 15 times less than the value the first tensile modulus; and d) machining said rod to form said composite reed;

wherein, in step b), the fibers of said plurality of fibers are kept substantially parallel to one another for embedding said plurality of fibers inside said polymer material, wherein the produced composite reed has a matrix made of the polymer material and the plurality of reinforcing fibers made of said other polymer material, embedded inside said matrix, wherein the individual reinforcing fibers of said plurality of fibers are continuous fibers, and wherein said individual reinforcing fibers each extend in a longitudinal direction of the reed and over an entire length of the reed, inside said matrix.

8. The process as claimed in claim 7, wherein said polymer material is a thermoplastic polymer material.

9. The process as claimed in claim 7, wherein said other polymer material has a melting point above the melting point of said polymer material.

10. The composite reed as claimed in claim 3, wherein said polymer material has a relative density of between 0.80 and 0.92.

11. The composite reed as claimed in claim 2, wherein said other polymer material is polypropylene.

12. The composite reed as claimed in claim 1, wherein the individual reinforcing fibers extend parallel to one another in the longitudinal direction of the reed and over the entire length of the reed.

13. The composite reed as claimed in claim 4, wherein said other polymer material is polypropylene.

14. The composite reed as claimed in claim 2, wherein said other polymer material has a melting point above the melting point of said polymer material.

15. The composite reed as claimed in claim 3, wherein said other polymer material has a melting point above the melting point of said polymer material.

16. The composite reed as claimed in claim 4, wherein said other polymer material has a melting point above the melting point of said polymer material.

17. The composite reed as claimed in claim 5, wherein said other polymer material has a melting point above the melting point of said polymer material.

18. The process as claimed in claim 8, wherein said other polymer material has a melting point above the melting point of said polymer material.

19. A composite reed (55) for a wind instrument which has a matrix made of a polymer material and a plurality of reinforcing fibers made of another polymer material, embedded inside said matrix, said other polymer material being a thermoplastic polymer material, wherein the reinforcing fibers of said plurality of fibers are continuous fibers, each of said fibers being an individual reinforcing fiber, all of said individual reinforcing fiber being made of a same polypropylene, wherein each of said individual reinforcing fibers extend in a longitudinal direction inside said matrix over an entire length of the reed, the individual reinforcing fibers being parallel to one another over the entire length of the reed, wherein said polymer material is a thermoplastic polymer material, and wherein a value of a first tensile modulus of the composite reed along a direction of the length of the composite reed is between 5000 and 15000 MPa, and a value of a second tensile modulus of the composite reed along a direction of the width of the composite reed is between 5 times less and 15 times less than the value the first tensile modulus.

* * * * *